United States Patent
Gauthier et al.

(10) Patent No.: US 12,389,067 B2
(45) Date of Patent: Aug. 12, 2025

(54) AUTOMATED PLAYBACK AND REDISTRIBUTION OF INTERNET STREAMING CONTENT

(71) Applicant: Bose Corporation, Framingham, MA (US)

(72) Inventors: Bruno Gauthier, Methuen, MA (US); David Geene, Jefferson, MA (US); Rajesh Mishra, Needham, MA (US)

(73) Assignee: Bose Corporation, Framingham, MA (US)

( * ) Notice: Subject to any disclaimer, the term of this patent is extended or adjusted under 35 U.S.C. 154(b) by 723 days.

(21) Appl. No.: 16/155,497

(22) Filed: Oct. 9, 2018

(65) Prior Publication Data
US 2019/0132640 A1    May 2, 2019

Related U.S. Application Data

(60) Provisional application No. 62/579,297, filed on Oct. 31, 2017.

(51) Int. Cl.
*H04N 21/4402* (2011.01)
*H04L 9/40* (2022.01)
(Continued)

(52) U.S. Cl.
CPC ..... *H04N 21/4402* (2013.01); *H04L 63/0815* (2013.01); *H04L 65/61* (2022.05); *H04L 65/765* (2022.05); *H04L 67/02* (2013.01); *H04N 21/25816* (2013.01); *H04N 21/4112* (2020.08); *H04N 21/4122* (2013.01); *H04N 21/43615* (2013.01); *H04N 21/4394* (2013.01);
(Continued)

(58) Field of Classification Search
CPC .......... H04N 21/4402; H04N 21/4394; H04N 21/4122; H04N 21/43615; H04N 21/25816; H04N 21/4104; H04N 21/25875; H04N 21/4782; H04N 21/44004; H04N 21/4753; H04L 67/02; H04L 65/605; H04L 63/0815
See application file for complete search history.

(56) References Cited

U.S. PATENT DOCUMENTS 5,721,780 A * 2/1998 Ensor ....................... G06F 21/31
                                                        713/153
6,791,904 B1 * 9/2004 Herron ................ H04L 12/2803
                                                         369/19
(Continued)

OTHER PUBLICATIONS

The International Search Report and the Written Opinion of the International Searching Authority mailed Feb. 1, 2019 for PCT Application No. PCT/US2018/058365.
(Continued)

*Primary Examiner* — Muhammad Raza
(74) *Attorney, Agent, or Firm* — Hoffman Warnick LLC (57) ABSTRACT

Automated playback and redistribution of internet streaming content using a device that is configured to receive a command to select a web media service, and automatically, without human intervention, retrieve user credentials for the selected web media service, use the command to select a correct web browser instance, retrieve a sign-in page from the selected web media service, insert the user credentials into the sign-in page, log into the web media service, then select a stream on the web media service and initiate playback of the selected stream.

14 Claims, 7 Drawing Sheets

(51) Int. Cl.
    *H04L 65/61* (2022.01)
    *H04L 65/75* (2022.01)
    *H04L 67/02* (2022.01)
    *H04N 21/258* (2011.01)
    *H04N 21/41* (2011.01)
    *H04N 21/436* (2011.01)
    *H04N 21/439* (2011.01)
    *H04N 21/44* (2011.01)
    *H04N 21/475* (2011.01)
    *H04N 21/4782* (2011.01)

(52) U.S. Cl.
    CPC . *H04N 21/25875* (2013.01); *H04N 21/44004* (2013.01); *H04N 21/4753* (2013.01); *H04N 21/4782* (2013.01)

(56) References Cited

U.S. PATENT DOCUMENTS

| | | | | |
|---|---|---|---|---|
| 7,720,918 | B1* | 5/2010 | Martin | H04L 67/63 709/227 |
| 7,996,488 | B1* | 8/2011 | Casabella | G06F 9/5038 709/219 |
| 8,863,085 | B1* | 10/2014 | Stahlberg | G06F 11/3668 717/124 |
| 10,601,946 | B2* | 3/2020 | Arsenault | H04L 65/762 |
| 2008/0263365 | A1* | 10/2008 | Aupperle | H04L 63/0815 713/185 |
| 2009/0254447 | A1* | 10/2009 | Blades | G06Q 30/0601 705/40 |
| 2013/0104060 | A1* | 4/2013 | Chandra | G06F 16/957 715/760 |
| 2014/0229331 | A1* | 8/2014 | McIntosh | G06Q 30/0633 705/26.41 |
| 2016/0231984 | A1* | 8/2016 | Beckhardt | G06F 3/16 |
| 2016/0315985 | A1* | 10/2016 | Sarkic | G06Q 50/01 |
| 2018/0241836 | A1* | 8/2018 | Arsenault | H04L 65/4084 |
| 2018/0343240 | A1* | 11/2018 | Marchand | H04W 8/005 |

OTHER PUBLICATIONS

W3TECHS Web Technology Surveys; Usage Statistics and Market Share of HTML5 for Websites, Apr. 2019; https://w3techs.com/technologies/details/ml-html5/all/all, last downloaded from the Internet Apr. 18, 2019.

Infoworld; Krill, Paul; Sep. 15, 2016; Flash vs. HTML5: The Last Stand; https://www.infoworld.com/article/3117746/web-development/flash-vs-html5-the-last-stand.html, last downloaded from the Internet on Apr. 18, 2019.

* cited by examiner

AUTOMATED PLAYBACK AND REDISTRIBUTION OF INTERNET STREAMING CONTENT

CROSS-REFERENCE TO RELATED APPLICATION

This application claims priority of Provisional Patent Application 62/579,297, filed on Oct. 31, 2017.

BACKGROUND

This disclosure relates to playback, control, and redistribution of internet streaming content.

Devices such as smartphones, tablets, computers, and other devices are sometimes used to access internet streaming media content at sites such as YouTube, Netflix, and Pandora, as only three of innumerable examples. The content can be played on the device, or redistributed to a different playback device, such as a television, a portable speaker, a smartphone, or a tablet, to name several non-limiting examples. For audio/video media, sometimes the video is played on the device, and the audio is sent to a wireless audio playback device, or another audio device with better sound quality and greater volume. In such cases, though, the audio and video may not be synchronized due to delays from wireless transmission and processing. Playback of audio/video media can be simplified if the wireless audio playback device is enabled to directly access and play the media.

SUMMARY

All examples and features mentioned below can be combined in any technically possible way.

In one aspect, a device for automated playback and redistribution of internet streaming content includes a processor, and a storage device having stored executable instructions that are operable, when executed by the processor, to cause the processor to receive a command to select a web media service, and in response to the command, automatically retrieve user credentials for the selected web media service, use the command to select a web browser instance, retrieve the sign-in page from the selected web media service, insert the user credentials into the sign-in page, log into the web media service, select a stream on the web media service, and initiate playback of the selected stream. The device can also be configured to further control the selected stream in response to received content control commands. This further control can include further control of playback of the selected stream (e.g., play, stop, pause, resume, forward, reverse, skip, and the like). The further control may be of device transport controls.

Embodiments may include one of the above or below features, or any combination thereof. Playback of the selected stream may be accomplished using the device. Playback of the selected stream may be accomplished using another connected device. The instructions may be further operable to send the selected stream to a final destination, where the selected stream is rendered.

Embodiments may include one of the above or below features, or any combination thereof. The stored executable instructions may comprise an application programming interface (API) that starts and controls a web browser instance. The stored executable instructions may comprise a plurality of APIs comprising one API for each of a plurality of separate web media services. Using the command to select a web browser instance may comprise determining from the command a selection of the API for a particular web media service. Using the command to select a web browser instance may further comprise running the selected API, to automatically connect to the particular web media service. The stored executable instructions may further comprise a web browser that is configured to access information from the world wide web. The plurality of APIs may reside within the web browser.

Embodiments may include one of the above or below features, or any combination thereof. The stored executable instructions may comprise an audio sink program that is configured to send the selected stream to a separate connected audio playback device, and/or a video sink program that is configured to send the selected stream to a separate connected video playback device, and/or a buffer that is configured to be coupled to a separate pull-mode video device.

In another aspect, a device for automated playback and redistribution of internet streaming content includes a processor and a storage device having stored executable instructions that are operable, when executed by the processor, to cause the processor to receive a command to select a web media service and in response to the receipt of the command, automatically retrieve user credentials for the selected web media service, use the command to select a web browser instance, retrieve the sign-in page from the selected web media service, insert the retrieved user credentials into the retrieved sign-in page, log into the web media service, select a stream on the web media service, and initiate playback of the selected stream using the device. The stored executable instructions may comprise a plurality of application programming interfaces (APIs) that each start and control a web browser instance and comprise one API for each of a plurality of separate web media services. Using the command to select a web browser instance may comprise determining from the command a selection of the API for a particular web media service, and running the selected API to automatically connect to the particular web media service. The stored executable instructions may further comprise a web browser that is configured to access information from the world wide web. The plurality of APIs may reside within the web browser.

DETAILED DESCRIPTION

Automated playback and redistribution of internet streaming content can be accomplished by a device such as a wireless audio playback device that is configured to receive a command to select a web media service, retrieve user credentials for the selected web media service, use the command to select a correct web browser instance, retrieve the sign-in page from the selected web media service, insert the user credentials, log into the service, select the stream on the web media service, and initiate playback of the stream. The automated playback and redistribution of internet streaming content thus allows a user to access and play web media simply by commanding the device to do so. The device can also be configured to further control internet streaming content in response to received commands. This further control can include further control of playback (e.g., pause, resume, forward, reverse, skip, and the like).

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Figure 1:
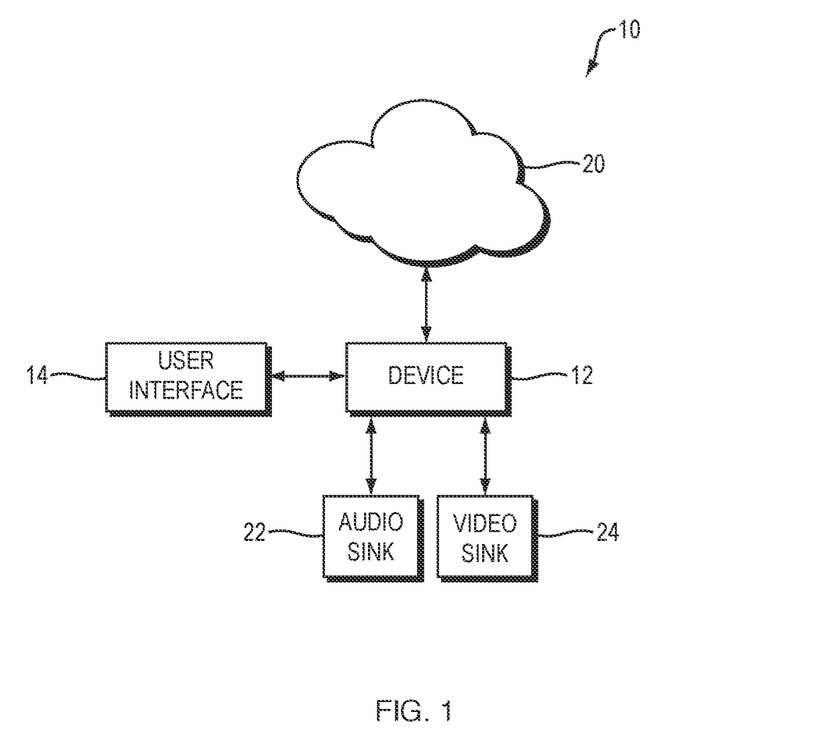
FIG. 1 is schematic block diagram of a system that can be used for the automated playback and redistribution of internet streaming content.

System 10, FIG. 1, can be used for the automated playback and redistribution of internet streaming content. Device 12 can be a device that is adapted to playback streamed content, such as audio or audio/video files. One non-limiting example of device 12 is a WiFi-enabled speaker, such as the Bose® SoundTouch® series of speakers (e.g., wireless audio playback devices). Device 12 has processing (e.g., a processor and associated memory that can store instructions that are executed by the processor), and communications capabilities, in addition to any necessary audio and/or video rendering capabilities. Device 12 is adapted to communicate with the cloud 20. Device 12 also has a user interface (UI) 14. The UI may be separate from or may be part of device 12. UI 14 is able to input commands to device 12. Non-limiting examples of UI 14 include a voice detector, a button, a touch-screen interface, a keyboard, and a smartphone or tablet running an appropriate app. System 10 and the automated playback and redistribution of internet streaming content are agnostic to the UI, it being necessary only that there is some means of inputting commands to device 12, either as part of device 12 or as part of a connected device/service. Device 12 is also configured to provide audio and/or video and/or audio/video to external devices or services. These are indicated in FIG. 1 by separate audio sink 22 and separate video sink 24. Aspects of system 10 are further explained below.

Figure 2:
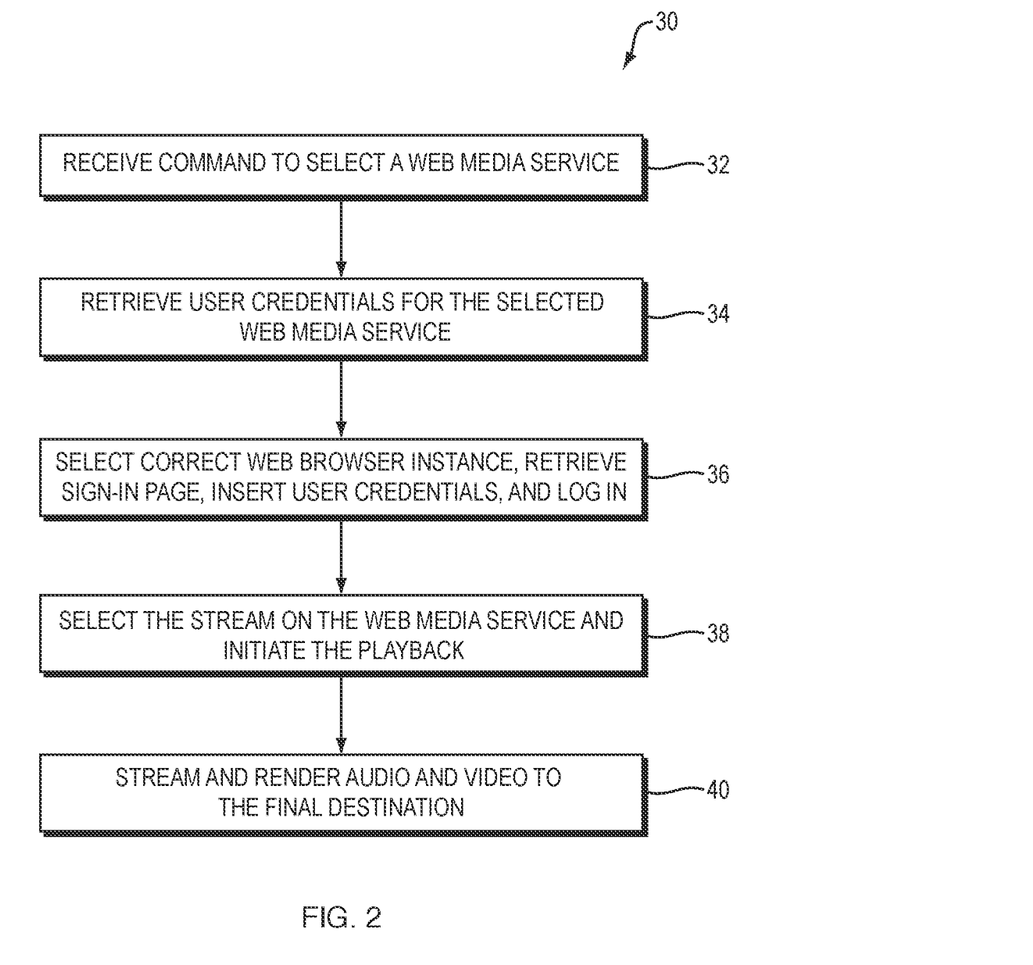
FIG. 2 is a flow chart of steps accomplished by the device of FIG. 1.

One process for the automated playback and redistribution of internet streaming content is shown in FIG. 2. Process 30 is accomplished using a device such as device 12, or another device that is configured to receive and process commands, retrieve internet streaming media, and play the media. The device can also have other functionalities described herein. The device receives a command to select a web media service, step 32. The command can be received in any technically-possible manner, such as through a voice or hardware user interface, or from a separate UI, for example. An input utterance can be replaced by a web socket command from an external computer. At step 34, user credentials for the selected web media service are retrieved by the device. The credentials can reside in the device, in another connected device, or in a cloud service, for example. At step 36, the command(s) are used by the device to select the correct web browser instance, which is further explained below. The device then retrieves the sign-in page from the selected web media service, inserts the user credentials, and logs into the service. Once the user is logged in, the device selects the stream on the web media service, and initiates playback of the stream, step 38. Playback can take place using the device, and/or using another connected device such as a portable computing device, a monitor, or a television, for example. In situations where media is to be streamed to one or more other devices or other final destinations, the device streams the audio and/or video to the final destination, where the stream is rendered, step 40. Note that steps 34-40 are performed by the device automatically, without human intervention.

Figure 3:
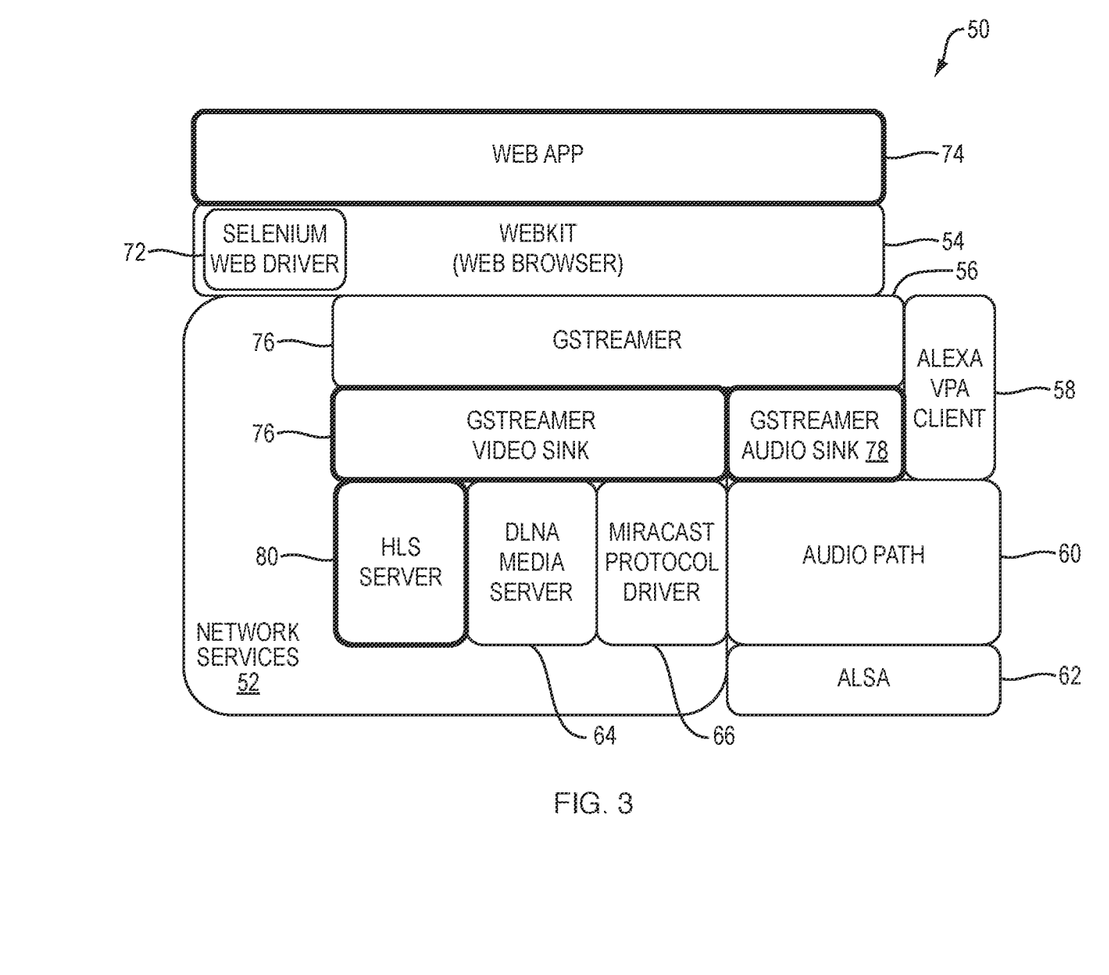
FIG. 3 schematically depicts a software stack that is involved in an example of the automated playback and redistribution of internet streaming content.

The automated playback and redistribution of internet streaming content can be accomplished using a device that is configured to play audio or audio/video streamed content. A non-limiting example detailed herein is a wireless audio playback device, shown in FIGS. 5A-5C. The device has processing capabilities, communication capabilities, and content-rendering capabilities. In the example where the device is a SoundTouch® device from Bose® Corporation of Framingham, MA, USA, software changes are made to enable the functionalities described herein. An exemplary software stack 50 that can be used to accomplish the automated playback and redistribution of internet streaming content, is shown in FIG. 3, where major software functionalities are depicted as separate function blocks.

Software stack 50 includes components that already exist in a wireless audio playback device, including web browser 54, network services 52, GStreamer 56, audio path 60 and Advanced Linux Sound Architecture (ALSA) 62 that are involved in audio output, Digital Living Network Alliance (DLNA) media server 64 and Miracast protocol driver 66 that are involved in video output, and virtual personal assistant (VPA) client 58 (in this case, for "Alexa" from Amazon). Note that these components, and the manners in which they operate to accomplish the functionalities of the wireless audio playback device, are known in the field and so are not further described herein. Components added to stack 50 to enable the automated playback and redistribution of internet streaming content include a web app 74 and a Selenium web driver 72 that both reside within web browser 54, GStreamer audio sink 78 that is involved in streaming audio to another destination, GStreamer video sink 76 that is involved in streaming video to another destination, and HTTP Live Streaming (HLS) server 80 that acts as a buffer for pull-mode video devices. Note that the Selenium web driver is one non-limiting example of a web driver that can be used herein. Also note that GStreamer is one non-limiting example of an audio/video pipeline that can be used herein. Further, note that depending on the use of the system, the Gstreamer audio and video sinks, and the HLS server, may not be necessary. The Web Driver is configured to accept commands and send them to a browser. The software stack includes one Web Driver for each supported internet media service, as is further described below.

The software stack preferably comprises an application programming interface (API) that starts and controls a web browser instance. The API may be but need not be the Selenium Web Driver. There are preferably a plurality of APIs comprising one such API for each of a plurality of separate web media services. The selection of the correct web browser instance in this case may comprise determining from the command a selection of the API for a particular web media service. The selected API can then be run so as to automatically connect to the particular web media service. Preferably, the APIs reside within a web browser that is part of the software stack.

As discussed above, the software stack preferably but not necessarily also includes an audio sink program that is configured to send the selected stream to a separate connected audio playback device and/or a video sink program that is configured to send the selected stream to a separate connected video playback device, and/or a buffer that is configured to be coupled to a separate pull-mode video device.

Figure 4:
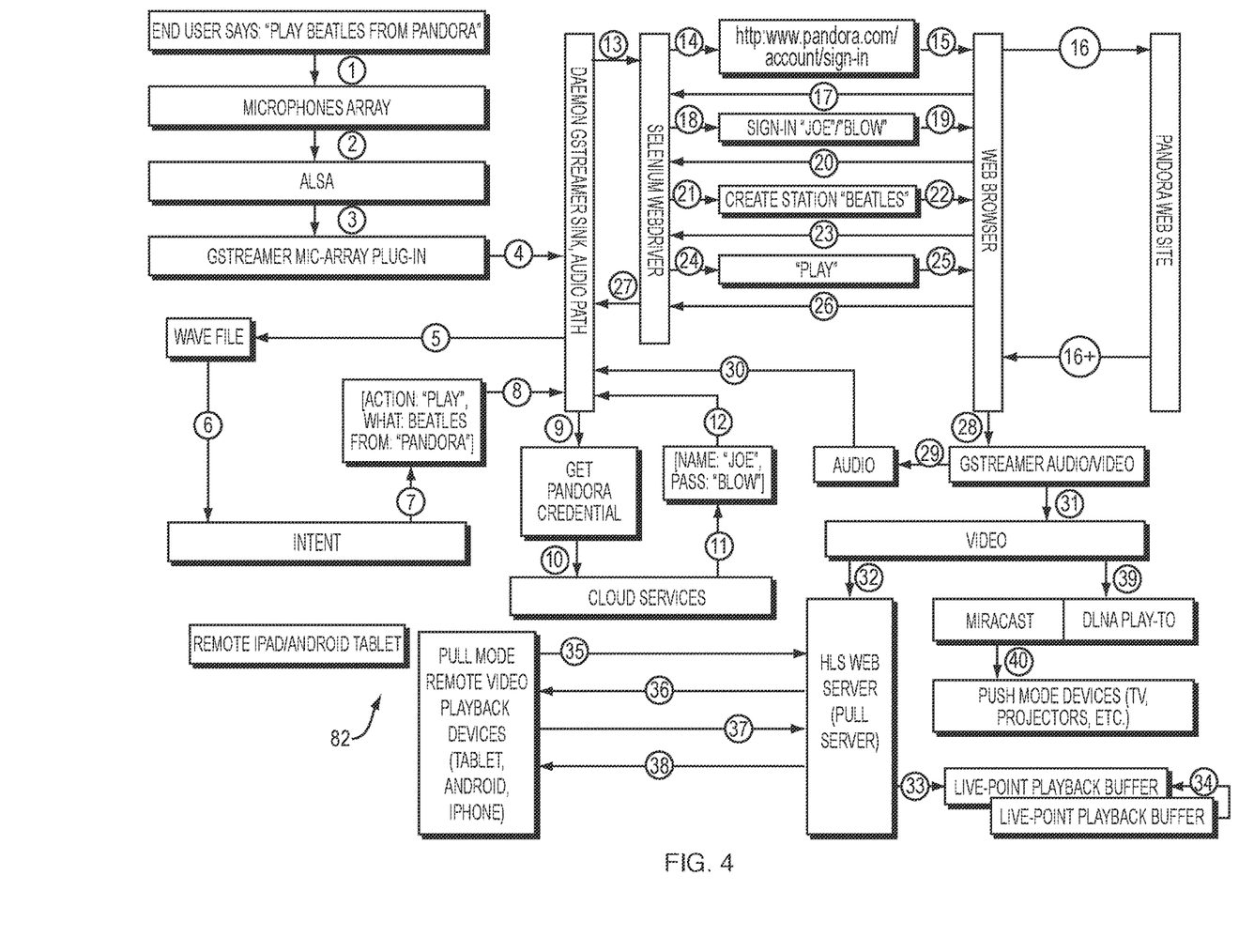
FIG. 4 is a state machine diagram of one particular non-limiting example of the automated playback and redistribution of internet streaming content using the software stack of FIG. 3.

A state machine 82 that illustrates one example of an automated playback and redistribution of internet streaming content is shown in FIG. 4. State machine 82 is a non-limiting example where the software stack 50 of FIG. 3 is part of a wireless audio playback device, where the device is used to automatically connect to an internet music streaming service/radio station (Pandora® in this non-limiting example), create a radio station called "Beatles" (the radio station and its name both being non-limiting examples) and play the "Beatles" music files streamed from Pandora®. The device can also be configured to further control internet streaming content in response to appropriate received commands. This further control can include, for example, device transport controls that further control media playback (e.g., play, stop, pause, resume, forward, reverse, skip, and the like). The commands in this case are input via a voice command that is interpreted by the device. As stated elsewhere, though, the present automated playback and redistribution of internet streaming content is agnostic of the source of the relevant command(s). The sources and destinations are set out in blocks in state machine 82. The states are indicated in FIG. 4 by the numbers in circles and the associated arrows. Table 1 below includes the states, the sources, the destinations, and a brief description of each operation.

TABLE 1

| State | Source | Destination | Description |
|---|---|---|---|
| 1 | End-user | Microphone | End-user says: ""Play Beatles from Pandora" |
| 2 | Microphone | ALSA | The microphone analog input(s) is/are sample and presented to up to eight [1 . . . 7] ALSA input device(s). |
| 3 | ALSA | GStreamer mic-array plug-in | The Gstreamer microphone array plug-in is continuously reading the ALSA input device(s) and provides an asynchronous event for a Voice Activated Detector (VAD). |
| 4 | GStreamer mic-array plug-in | Daemon | After sending the "VAD ON" event to the Daemon/GStreamer sink, the mic-array is providing the wave file "Play Beatles from Pandora" with the echo removed and the (angular location, distance) of the voice source from the mic-array. The normal sequence of events is: {event("VAD ON"), location(angle, distance), *[voice wave chunks], event("VAD OFF")} |
| 5 | Daemon | Wave file | The Daemon may/may not filter, record, or do some treatment to the voice command. |
| 6 | Wave file command | Intent | We are assuming the Alexa registration process is already completed.<br>The voice pipeline between Alexa and the device will start just after the "VAD ON" is received. The first complete voice chunk is received a few milliseconds after the "VAD ON" event. Voice chunks are 16 bits linear PCM, mono, little endian of 10 ms width which gives 320 bytes. |
| 7 | Intent | Command translation | The Intent then translates the wave file into text and returns the results through the AVS Down channel. |
| 8 | Command translation | Daemon | The command translation is forward to the Daemon. |
| 9 | Daemon | Get Pandora credential | The Daemon is requesting the Pandora credentials of the end-user |
| 10 | Get Pandora credential | Cloud Services | The credentials request is passed to the cloud services. |
| 11 | Cloud Services | Pandora credential | The cloud services return the Pandora credentials (e.g., user name and password). |
| 12 | Pandora credential | Daemon | The Pandora credentials are returned to the Daemon. |
| 13 | Daemon | Selenium WebDriver | The Daemon selects the Selenium "Pandora" use case and runs it. |
| 14 | Selenium WebDriver | Sign-in Pandora | The Selenium WebDriver is connecting with the web browser and accesses the Pandora sign-in page. |
| 15 | Sign-in Pandora | Web browser | The Selenium WebDriver is "getting" the Pandora sign-in page. |
| 16 | Web browser | Pandora web site | The web browser is asking for the Pandora sign-in page from the Pandora web site. |
| 16+ | Pandora web site | Web browser | The Pandora website responds to web client and returns the requested page. |
| 17 | Web browser | Selenium WebDriver | The web client receives the Pandora sign-in and feeds the Selenium Document Object Model (DOM).<br>The Selenium WebDriver is now able to "find" and "sendKeys" and "click" any of the elements of the DOM. |

TABLE 1-continued

| State | Source | Destination | Description |
|---|---|---|---|
| 18 | Selenium WebDriver | Pandora credential Selenium WebDriver use case | The Selenium WebDriver is inserting the end-user Pandora credentials in the DOM of the Pandora sign-in web page. N.B.: To simplify the state diagram, the interaction from/to the web browser to the Pandora web site is not filled. |
| 19 | Pandora credentials | Web Browser | Once the credentials are filled in the DOM model, the Selenium WebDriver use case is pressing the "Log In" button with a "click" DOM command. |
| 20 | Web Browser | Selenium WebDriver | See: 17 above |
| 21 | Selenium WebDriver | Pandora create station | See: 14 above |
| 22 | Pandora create station | Web Browser | See: 15 above |
| 23 | Web Browser | Selenium WebDriver | See: 17 above |
| 24 | Selenium WebDriver | Pandora Play command | See: 14 above |
| 25 | Pandora Play command | Web Browser | See: 15 above |
| 26 | Web Browser | Selenium WebDriver | See: 17 above |
| 27 | Selenium WebDriver | Daemon | The "Play Beatles" command is completed, the web browser will eventually start streaming through an HTML 5 audio tag. The software stack notifies the audio path. |
| 28 | Web Browser | Gstreamer | The Web browser is now streaming audio and video through Gstreamer transport stream plug-in. |
| 29 | GStreamer | Audio | The demuxed audio is sent to the GStreamer audio plugin. |
| 30 | Audio | Daemon | The Daemon is receiving the audio stream chunks from Pandora and feeding them to the Audio path. Transcoding may be required. |
| 31 | GStreamer | Video | The demuxed video is sent to the GStreamer video plugin. |
| 32 | Video | HLS Server | The video segments are sent to the HLS server |
| 33 | HLS Server | Live playback buffer | On a new stream transition, the HLS server updates the playlist with the new title, duration and the discontinuity flag of the new stream. On a new segment from the same stream, the new segment reference is added to the play list. |
| 34 | Live playback buffer | Live playback buffer | The video segments are stored in a circular list where the oldest is ejected by the newest segment. |
| 35 | Pull mode remote device | HLS Server | The remote pull device, an Android phone for instance, requests the playlist by accessing the device_ip_address:hls_server_port |
| 36 | HLS Server | Pull mode remote device | The HLS server returns the playlist (CODECs type, duration, titles, etc.) |
| 37 | Pull mode remote device | HLS Server | The remote pull device requests a video segment from the playlist. |
| 38 | HLS Server | Pull mode remote device | The video segment is returned from the HLS server to the pull mode device. The state machine returns to 37. |
| 39 | Video | Miracast/DLNA play-to | The video content is sent to the Miracast and/or DLNA play-to driver. |
| 40 | Miracast/DLNA play-to | Push mode remote devices | The remote Miracast/DLNA play-to enabled device starts receiving video from the device. |

The software stack is run in several different processes. The first is a daemon, which is a standard daemon/service waiting from an input/utterance/command to load the appropriate Selenium driver. In the state machine description, the command is coming from the VPA/Alexa/Voice Personal Assistant. Another process is the Selenium Web driver and web application which receive a playback command from the daemon. Both the Selenium driver and the web application reside in the web browser space. The web application is the generic engine to fetch the audio/video content and play it back. The Selenium driver mimics the actions of a real end-user who would be using the media service to do the playback using a mouse etc. in the appropriate web site. Note also that GStreamer is running inside the web browser as a library. The GStreamer library can be extended with different plug-ins and sinks. GStreamer will drive the content to Miracast and/or DLNA play-to directly when required. Another process is the HLS web server, which waits from the playlist and the video content request from an external pull mode application (e.g., a smartphone video player). Push mode video devices are handled differently as set forth in the State Machine and in Table 1.

The intent indicates an actionable command that is understood by a software entity. A voice (speech) processing system can be described as a series of stages: Voice Pickup—typically comprising of a microphone (or collection of mics) on the product to convert speech input into a digital audio signal. Wake word detection—a pre-programmed word such as "Alexa" on the product is recognized by this detection sub-system. Speech Transmission—the digital audio signal for an entire phrase (such as "Alexa, what's the weather?") is transferred from the product to an external voice processing software (typically a Cloud Service—such as Amazon's Alexa Voice Service). Speech-To-Text (STT) conversion—the digital audio signal is converted to a text phrase (such as "Alexa, what's the weather?"). Intent Mapping—the phrase "Alexa, what's the weather" is converted to a command that can be acted upon by a software entity (such as a REST API command "GET {Attribute: Weather}". Intent Transmission—the command is sent to the product or another Cloud Service to perform an operation (such as requesting weather.com to report the weather). Intent Processing—the product or cloud service executes the command and reports the result to the requesting software entity. Command Response—once the command has executed, a response is generated in a format that software entity understands (such as "{Weather:Cloudy}"). Text-To-Speech (TTS) conversion—the command response is converted to speech as a digital audio signal, typically by a Cloud Service (such as "It's Cloudy today"). Voice Response Transmission—the response is sent as a digital audio signal to the product. Voice Response Output—the product's speaker (or collection of speakers) converts the digital audio signal to analog audio to be heard.

The Selenium Web Driver for each media service can be developed as follows. In general, the DOM element names for the login credentials and the playback control are extracted from the media content provider web site. These DOM element names are fed to a web driver template to generate a specific media content provider web driver. More specifically, this can be accomplished by opening the media content provider web page and extracting the DOM element names for the login credential input (user name and password input element), logging into the media content provider and finding the media playback control DOM element name, and then editing the generic web driver to replace the 'media_content_url' variable with the new media content provider url, replace the 'user_name_dom_element_name' and 'playback_control_dom_element_name' with the DOM credential element names found as above, and replace the 'playback_control_dom_element_name' with the DOM playback control element name found as above. Note that the action of writing a Selenium Web Driver for a media content provider can be automated. Also, the Selenium Web Drivers can reside in the cloud and be accessed by the device. This way, updates to all devices (such as the addition of a new supported media service, or changes to reflect changes made to the media service web site) can be accomplished by making changes to the appropriate Selenium Web Driver in the cloud server.

Figure 5A:
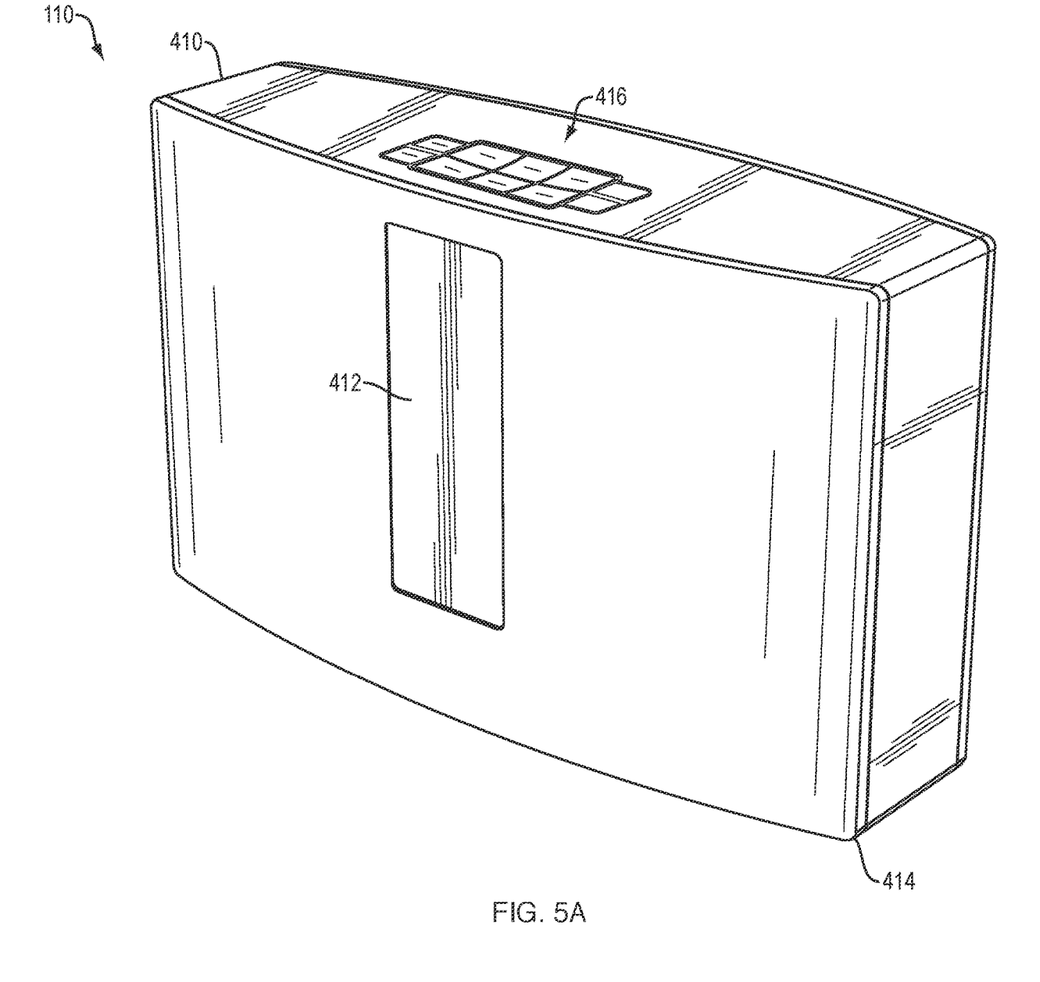
FIGS. 5A-5C illustrate an exemplary wireless audio playback device that can be used in the automated playback and redistribution of internet streaming content.
Figure 5B:
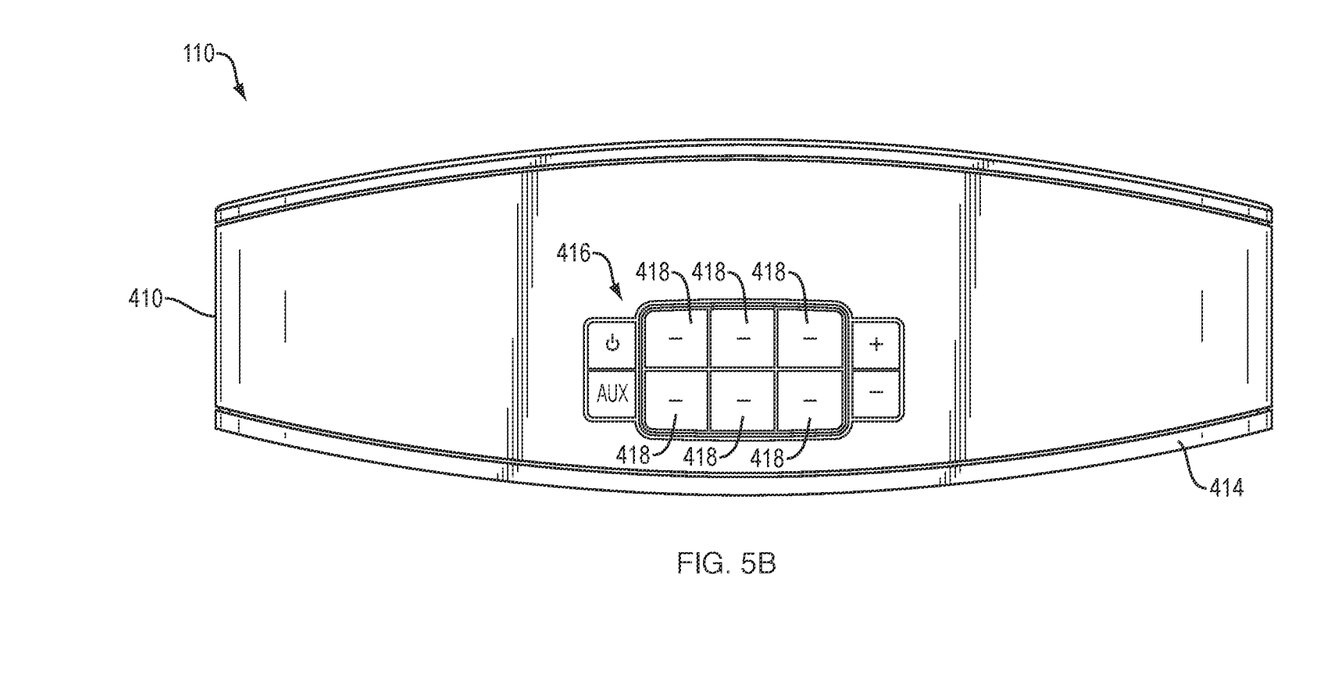
Figure 5C:
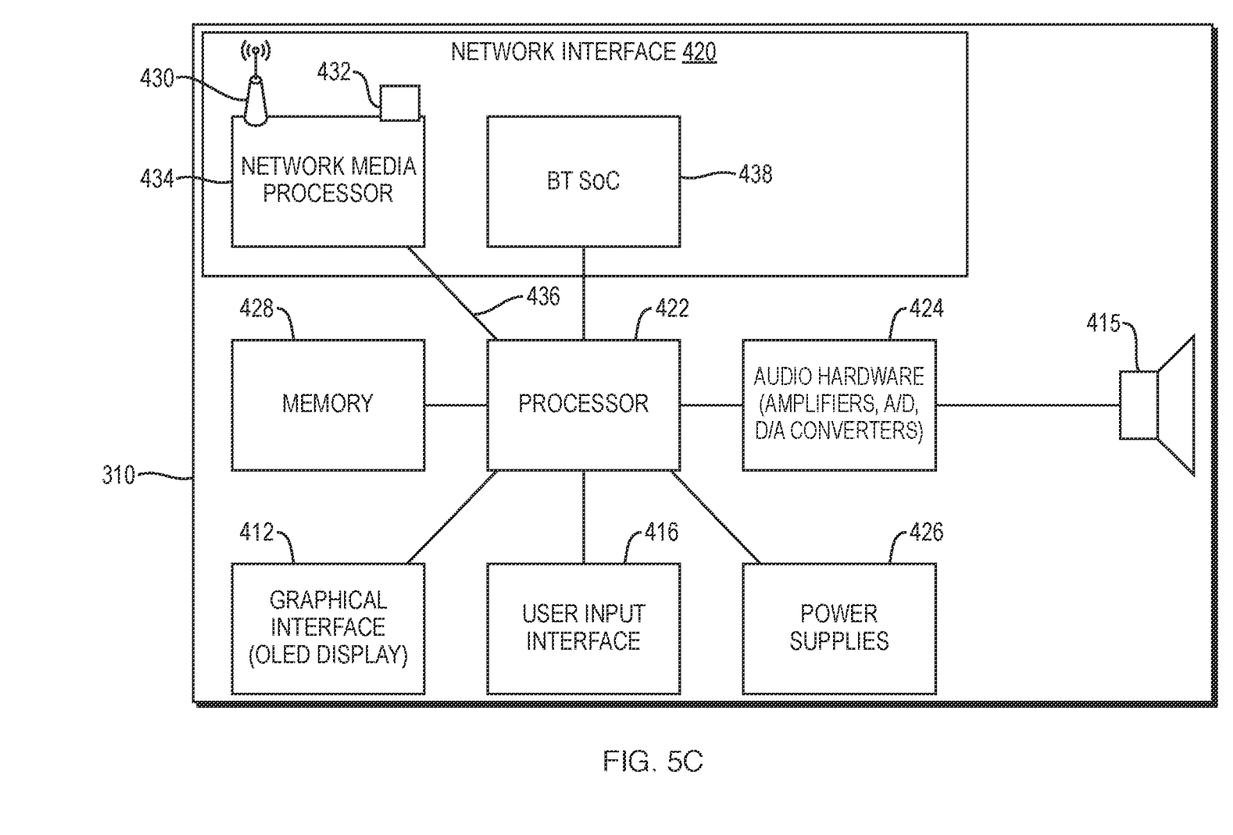

An exemplary wireless audio playback device 110 will now be described in greater detail with reference to FIGS. 5A through 5C. Device 110 is an example of a device that can be used to accomplish the automated playback and redistribution of internet streaming content. Referring to FIG. 5A, a wireless audio playback device 110 includes an enclosure 410 and on the enclosure 410 there may reside a graphical interface 412 (e.g., an organic light emitting diode (OLED) display) which can provide the user with information regarding currently playing ("Now Playing") music, information regarding the presets, and other information. A screen 414 conceals one or more electro-acoustic transducers 415 (FIG. 5C). The audio playback device 110 also includes a user input interface 416. As shown in FIG. 5B, the user input interface 416 in this non-limiting example includes a plurality of preset indicators 418, which are hardware buttons in the illustrated example. The preset indicators 418 (numbered 1-6) provide the user with easy, one press access to digital audio sources or entities assigned to those buttons, and potentially to other functions. That is, a single press of a selected one of the preset indicators 418 will initiate streaming and rendering of content from the assigned entity.

The assigned entities can be associated with different ones of the digital audio sources such that a single audio playback device 110 can provide for single press access to various different digital audio sources. In one example, the assigned entities include at least (i) user-defined playlists of digital music and (ii) an Internet radio station. In another example, the assigned entities include individual radio stations provided by an Internet radio site.

Notably, the preset indicators 418 operate in the same manner, at least from a user's perspective, regardless of which entities are assigned and which of the digital audio sources provide the assigned entities. That is, each preset indicator 418 can provide for single press access to its assigned entity whether that entity is a user-defined playlist of digital music provided by an NAS device or an Internet radio station provided by an Internet music service, for example.

With reference to FIG. 5C, the audio playback device 110 also includes a network interface 420, a processor 422, audio hardware 424, power supplies 426 for powering the various audio playback device components, and memory 428. Each of the processor 422, the graphical interface 412, the network interface 420, the audio hardware 424, the power supplies 426, and the memory 428 are interconnected using various buses, and several of the components may be mounted on a common motherboard or in other manners as appropriate.

The network interface 420 provides for communication between the audio playback device 110, a remote server, the audio sources, an audio playback device controller such as a smartphone or tablet, and other audio playback devices 110 via one or more communications protocols. The network interface 420 may provide either or both of a wireless interface 430 and a wired interface 432. The wireless interface 430 allows the audio playback device 110 to communicate wirelessly with other devices in accordance with a communication protocol such as such as IEEE 802.11 b/g. The wired interface 432 provides network interface functions via a wired (e.g., Ethernet) connection.

In some cases, the network interface 420 may also include a network interface processor 434. If the audio playback device supports Apple AirPlay® (a proprietary protocol stack/suite developed by Apple Inc., with headquarters in Cupertino, California, that allows wireless streaming of audio, video, and photos, together with related metadata between devices), then processor 434 may include network media processor functionality. When network media processor functionality is present, if a user connects an AirPlay® enabled device, such as an iPhone or iPad device, to a LAN, the user can then stream music to the network connected audio playback devices 110 via Apple AirPlay®. The network interface processor 434 provides network access (i.e., the Wi-Fi network and/or Ethernet connection can be provided through the network interface processor 434) and can support AirPlay® audio. AirPlay® audio signals are passed to the processor 422, using the I2S protocol (an electrical serial bus interface standard used for connecting digital audio devices), for downstream processing and playback. The audio playback device 110 in this case can support audio-streaming via multiple protocols such as AirPlay® and/or DLNA's UPnP protocol, all integrated within one device.

All other digital audio coming from network packets comes straight from the network interface processor 434 through connection (e.g., USB bridge) 436 to the processor 422 and runs into the decoders, DSP, and eventually is played back (rendered) via the electro-acoustic transducer(s) 415.

The network interface 420 can also include a Bluetooth (BT) system-on-chip (SoC) 438 for Bluetooth applications (e.g., for wireless communication with a Bluetooth enabled controller (not shown)). Suitable BT SoC devices are known in the art and so are not further described herein.

Streamed data pass from the network interface 420 to the processor 422. The processor 422 can execute instructions within the audio playback device (e.g., for performing, among other things, the automated playback and redistribution of internet streaming content, digital signal processing, decoding, and equalization functions), including instructions stored in the memory 428. The processor 422 may be implemented as a chipset of chips that include separate and multiple analog and digital processors. The processor 422 may provide, for example, for coordination of other components of the audio playback device 110, such as control of user interfaces, and applications run by the audio playback device 110.

The processor 422 provides a processed digital audio signal to the audio hardware 424 which includes one or more digital-to-analog (D/A) converters for converting the digital audio signal to an analog audio signal. The audio hardware 424 also includes one or more amplifiers which provide amplified analog audio signals to the electroacoustic transducer(s) 415 for playback. In addition, the audio hardware 424 may include circuitry for processing analog input signals to provide digital audio signals for sharing with other devices.

The memory 428 may include, for example, flash memory and/or non-volatile random-access memory (NVRAM). In some implementations, instructions (e.g., software) are stored in memory 428. The instructions, when executed by one or more processing devices (e.g., the processor 422), perform one or more processes, such as those described above. The instructions can also be stored by one or more storage devices, such as one or more computer- or machine-readable mediums (for example, the memory 428, or memory on the processor). The instructions may include instructions for performing decoding (i.e., the software modules include the audio codecs for decoding the digital audio streams), as well as digital signal processing and equalization.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. An audio-enabled device that is configured for automated playback and redistribution of internet streaming content that includes at least streaming audio, comprising:
an electro-acoustic transducer that is configured to generate sound from input audio signals;
a processor; and
a storage device having stored executable instructions that are operable, when executed by the processor, to cause the processor to:
  i) receive a user-initiated command that is effective to select one web media service from among a plurality of separate web media services, wherein each of the web media services is enabled to provide at least streaming audio content; and
  ii) in response to the receipt of the user-initiated command accomplish the following, automatically and without further user input:
    retrieve, from a computer memory, previously-established user credentials for the selected web media service;
    determine from the user-initiated command a specific web browser instance for the selected web media service from among a plurality of separate web browser instances that are stored and available for use, wherein there is one specific web browser instance for each of the plurality of separate web media services;
    retrieve a sign-in page from the selected web media service using the specific web browser instance;
    insert the retrieved user credentials into the retrieved sign-in page, to establish a completed sign-in page;
    log into the selected web media service from the completed sign-in page;
    select a stream that includes at least streaming audio content on the selected web media service using the received command;
    receive the selected stream; and
    initiate playback of audio content from the received stream by providing the audio content to audio hardware that develops from the audio content audio signals that are provided to the transducer, which generates sound from the audio signals,
  wherein the stored executable instructions comprise a plurality of application programming interfaces (APIs) that each automatically start and control a web browser instance and comprise one API for each of the plurality of separate web media services;
  wherein determining from the user-initiated command a particular web browser instance comprises automatically determining from the command a selection of the API for a particular web media service, and running the selected API to automatically connect to the particular web media service, and
  wherein the automatically determining from the command the selection of the API for a particular web media service reduces latency between the user-initiated command and the audio playback.

2. The device of claim 1, wherein playback of audio content from the received stream is further accomplished using another connected audio-enabled device.

3. The device of claim 1, wherein the instructions are further operable to automatically and without user input send the selected stream to a final destination, where the selected stream is rendered.

4. The device of claim 1, wherein the instructions are further operable to automatically further control the selected stream in response to received content control commands.

5. The device of claim 4, wherein the instructions are further operable to automatically further control the playback of the selected stream.

6. The device of claim 5, wherein the further control of the playback of the selected stream comprises device transport controls.

7. The device of claim 1, wherein determining from the user-initiated command a specific web browser instance further comprises automatically and without user input running the selected API, to automatically connect to the particular web media service.

8. The device of claim 1, wherein the stored executable instructions further comprise a web browser that is configured to automatically and without user input access information from the world wide web.

9. The device of claim 8, wherein the plurality of APIs reside within the web browser.

10. The device of claim 1, wherein the stored executable instructions comprise an audio sink program that is configured to automatically send the selected stream to a separate connected audio playback device.

11. The device of claim 1, wherein the stored executable instructions comprise a video sink program that is configured to automatically send the selected stream to a separate connected video playback device.

12. The device of claim 1, wherein the stored executable instructions comprise a buffer that is configured to be coupled to a separate pull-mode video device.

13. An audio-enabled device that is configured for automated playback and redistribution of internet streaming content that includes at least streaming audio, comprising:
   an electro-acoustic transducer that is configured to generate sound from input audio signals;
   a processor; and
   a storage device having stored executable instructions that are operable, when executed by the processor, to cause the processor to:
   i) receive a user-initiated command that is effective to select one web media service from among a plurality of separate web media services, wherein each of the web media services is enabled to provide at least streaming audio content; and
   ii) in response to the receipt of the user-initiated command accomplish the following, automatically and without further user input:
      retrieve, from a computer memory, previously-established user credentials for the selected web media service;
      determine from the user-initiated command a specific web browser instance for the selected web media service from among a plurality of separate web browser instances that are stored and available for selection, wherein there is one specific web browser instance for each of the plurality of separate web media services;
      retrieve a sign-in page from the selected web media service using the specific web browser instance;
      insert the retrieved user credentials into the retrieved sign-in page, to establish a completed sign-in page;
      log into the selected web media service from the completed sign-in page;
      select a stream that includes at least streaming audio content on the selected web media service using the received command;
      receive the selected stream; and
      initiate playback of audio content from the received stream by providing audio content to audio hardware that develops from the audio content audio signals that are provided to the transducer, which generates sound from the audio signals;
   wherein the stored executable instructions comprise a plurality of application programming interfaces (APIs) that each automatically start and control a web browser instance and comprise one API for each of the plurality of separate web media services;
   wherein determining from the user-initiated command a particular web browser instance comprises automatically determining from the command a selection of the API for a particular web media service, and running the selected API to automatically connect to the particular web media service,
   wherein the automatically determining from the command the selection of the API for a particular web media service reduces latency between the user-initiated command and the audio playback;
   wherein the stored executable instructions further comprise a web browser that is configured to access information from the world wide web, and wherein the plurality of APIs reside within the web browser.

14. The device of claim 13, wherein playback of audio content from the received stream is further accomplished using another connected audio-enabled device.

* * * * *